(12) United States Patent
Fee

(10) Patent No.: US 6,963,995 B2
(45) Date of Patent: Nov. 8, 2005

(54) NETWORK RESTORATION USING REFRESHED SWITCH STATE TABLES

(75) Inventor: John A. Fee, Garland, TX (US)

(73) Assignee: MCI, Inc., Ashburn, VA (US)

( * ) Notice: Subject to any disclaimer, the term of this patent is extended or adjusted under 35 U.S.C. 154(b) by 497 days.

(21) Appl. No.: 10/132,372

(22) Filed: Apr. 24, 2002

(65) Prior Publication Data

US 2003/0204768 A1 Oct. 30, 2003

(51) Int. Cl.⁷ .............................................. G06F 11/00
(52) U.S. Cl. .......................... 714/4; 714/43; 370/244; 398/12
(58) Field of Search ...................... 714/4, 43; 370/216, 370/244, 228, 239; 709/223, 228; 398/1, 9, 10, 12

(56) References Cited

U.S. PATENT DOCUMENTS

| | | | | |
|---|---|---|---|---|
| 4,956,835 A | * | 9/1990 | Grover | 370/228 |
| 5,146,452 A | * | 9/1992 | Pekarske | 370/228 |
| 5,657,320 A | | 8/1997 | Russ et al. | 370/217 |
| 5,680,326 A | | 10/1997 | Russ et al. | 364/514 R |
| 5,740,157 A | * | 4/1998 | Demiray et al. | 370/219 |
| 5,781,535 A | | 7/1998 | Russ et al. | 370/248 |
| 5,852,600 A | | 12/1998 | Russ | 370/228 |
| 5,862,125 A | | 1/1999 | Russ | 370/228 |
| 5,870,212 A | | 2/1999 | Nathan et al. | 359/119 |
| 5,881,048 A | * | 3/1999 | Croslin | 370/228 |
| 5,884,017 A | | 3/1999 | Fee | 395/182.02 |
| 5,914,794 A | | 6/1999 | Fee et al. | 359/110 |
| 6,038,044 A | | 3/2000 | Fee et al. | 359/119 |
| 6,052,360 A | * | 4/2000 | Rogers | 370/216 |
| 6,111,672 A | | 8/2000 | Davis et al. | 359/110 |
| 6,222,821 B1 | | 4/2001 | Sees et al. | 370/277 |
| 6,226,111 B1 | * | 5/2001 | Chang et al. | 398/9 |
| 6,292,464 B1 | | 9/2001 | Elahmadi et al. | |
| 6,295,275 B1 | * | 9/2001 | Croslin | 370/216 |
| 6,421,349 B1 | * | 7/2002 | Grover | 370/408 |
| 6,731,631 B1 | * | 5/2004 | Chang et al. | 370/388 |
| 6,744,727 B2 | * | 6/2004 | Liu et al. | 370/228 |
| 6,785,225 B1 | * | 8/2004 | Sugawara et al. | 370/225 |
| 6,785,226 B1 | * | 8/2004 | Oltman et al. | 370/228 |
| 2001/0034853 A1 | * | 10/2001 | Takatama et al. | 714/4 |

* cited by examiner

Primary Examiner—Robert Beausoliel
Assistant Examiner—Emerson Puente (57) ABSTRACT

An exemplary method and optical network that provide optical network restoration using refreshed state tables are disclosed. The exemplary method for recovering from a failure in an optical network using refreshed switch state tables includes generating and storing connection information in switch state tables of associated optical switches that define optical link connections to be made in the event of a failure, monitoring whether a failure has occurred, and refreshing the switch state tables by continuing to generate and store connection information in the plurality of switch state tables that are associated with the plurality of optical switches of the optical network until the failure in the optical network is detected. Once the failure is detected, optical switching is automatically performed in the optical switches based on the lookup table connection information in the switch state tables that are associated with the optical switches. The exemplary method may then include determining whether any of the telecommunications traffic in the optical links of the optical network was not restored due to the optical switching that was automatically performed.

27 Claims, 5 Drawing Sheets

NETWORK RESTORATION USING REFRESHED SWITCH STATE TABLES

TECHNICAL FIELD OF THE INVENTION

This invention relates in general to the field of network restoration and more particularly to network restoration using refreshed switch state tables.

BACKGROUND OF THE INVENTION

Optical networks include various optical switches or nodes coupled through a network of optical fiber links. Optical network failures or faults may be caused by any number of events or reasons, including damaged or severed optical fibers, or equipment failure. Because optical fibers may be installed virtually anywhere, including underground, above ground or underwater, they are subject to damage through a variety of ways and phenomena. Optical fibers and optical equipment may be damaged or severed, for example, by lightning, fire, natural disasters, traffic accidents, digging, construction accidents, and the like.

Because optical fibers carry far greater amounts of information than conventional copper wires used to transmit electrical telecommunications signals, the loss of an optical fiber can cause far more user disruptions when compared with the loss of a copper wire. Because dozens of fibers may be routed within a single cable or conduit, a damaged or severed cable or conduit will potentially result in far greater user disruptions and outages than the loss of a cable or conduit of copper wires.

To reduce the negative effects of optical network failures, optical network topologies are provided in arrangements and configurations, such as mesh or ring topologies, so that telecommunications traffic may traverse the optical network using multiple optical links. This allows such optical networks to be reconfigured to route around network failure point. An optical network may include both working links or paths and spare links or paths that may be used to assist with optical network restoration. The optical switches of the network may be programmed to configure their ingress and egress ports based on a switch state table. During optical network restoration, these switch state tables must be modified, changed or implemented to route telecommunications traffic around the failure and to minimize the loss of telecommunications traffic. Because of the large amount of data or bandwidth an optical network carries, the amount of time it takes to identify the location of an optical network failure, and the time it takes then to reconfigure the optical network, significant amounts of telecommunications traffic are often lost. Further, the reconfiguration of an optical network may result in the loss of other telecommunications traffic if not done efficiently or optimally. The capability to detect failures in an optical network is generally considered more difficult than detecting a failure in a telecommunications network that operates in the electrical domain. This failure detection difficulty normally results in increased time to locate a network failure, which further complicates the capability to efficiently restore a failure in an optical network.

The capability to quickly recognize a fault or failure and to efficiently and quickly restore normal traffic flow is crucial to the overall performance and reliability of the optical network, which is critical to an optical network operator, such as a telecommunications carrier or business enterprise, and its users. Prolonged outages result in decreased network revenues, business losses by commercial users, and an overall reduction in user confidence and satisfaction. For example, the loss of a single optical link, such as an optical link carrying a Wavelength Division Multiplexed ("WDM") signal, may result in the loss of hundreds of thousands of phone calls and computer data transmissions.

Prior restoration techniques and methodologies were generally designed for restoring telecommunications networks operating in the electrical domain as opposed to the optical domain, which presents additional challenges. Unfortunately, each of these techniques suffer from significant problems and disadvantages.

One technique involves the use of a central control and central database to model the network, to monitor network operations, and communicate instructions to each node or OCCS in response to a failure. The central control and dispatch model suffers from a serious speed disadvantage because of the time it takes to detect failures, communicate failures to the central control, to calculate an acceptable solution, and then to communicate back to each node a desired switch configuration. Often, the central control approach is inaccurate because the most recent model of the network is not used. This approach is not acceptable in most optical networks, especially WDM optical networks.

An improvement, in some respects, on the central control technique is the use of central control with predetermined switch configurations for various potential optical network failures. This provides faster restoration because of the elimination of the need to calculate an acceptable solution each time a failure occurs. This solution still may suffer significant disadvantages, such as excessive time to contact each such OCCS with the needed provision information and the results may be based on bad or inaccurate network model information.

Another technique includes the use of a Distributed Restoration Algorithm("DRA"). When DRA is used, it is assumed that the various cross connect switches can communicate messages to each other in a peer-to-peer fashion. This may be achieved through the use of excess network capacity, through a signaling network or the use of a separate wide area network. These messages may include flooding messages where, when a connection fails or is lost, a sender node or cross connect switch sends out a message that will eventually be passed around the network until the message is received at the other node of the lost link. In this manner, the two affected nodes or switches can communicate and a second path can be setup to work around the failed link. Unfortunately, for optical networks, this technique of messaging before the link is restored takes too long. Response times as short as 100 to 200 milliseconds may result in dropped traffic. Another disadvantage is that the various nodes may get into a loop condition where the nodes are contending against one another for network resources.

SUMMARY OF THE INVENTION

From the foregoing it may be appreciated that a need has arisen for network restoration of an optical network using refreshed switch state tables that provide the capability to quickly and efficiently recover from a fault or failure in the optical network. In accordance with the present invention, network restoration of an optical network using refreshed switch state tables is provided that substantially eliminates one or more of the disadvantages and problems outlined above.

According to one aspect of the present invention, an exemplary method for recovering from a failure in an optical network using refreshed switch state tables includes generating and storing connection information in a distributed manner in switch state tables of associated optical switches that define optical link connections to be made in the event of a failure, monitoring whether a failure has occurred, and refreshing the switch state tables by continuing to generate and store connection information (e.g., DRA or MPLS) in the plurality of switch state tables that are associated with the plurality of optical switches of the optical network until the failure in the optical network is detected. Once the failure is detected, optical switching is automatically performed in the optical switches based on the connection information in the switch state tables that are associated with the optical switches. The exemplary method may then include determining whether any of the telecommunications traffic in the optical links of the optical network was not restored due to the optical switching that was automatically performed.

According to another aspect of the present invention that may be used in an optical network that includes a plurality of optical switches, a method for recovering from a failure in a portion of the optical network is provided. The method includes providing an associated switch state table that contains connection information that determines what connections are to be made through at least one optical switch according to failure conditions detected in the optical network, automatically determining a plan of action, prior to the failure, for how to perform optical switching in the optical network to recover from the failures, automatically providing the connection information of the switch state table to the at least one optical switch based on the plan of action and in response to the failure, and upon detection of the failure, establishing connections in the optical switch according to the contents of the switch state table.

According to another aspect of the present invention, an optical network operable to provide network restoration from a failure in the optical network using refreshed switch state tables is provided. The optical network includes a plurality of optical switches with associated switch state tables for storing connection information, optical links operable to connect between at least two of the plurality of optical switches of the optical network, and a network restoration system. The network restoration system operable to detect when the failure occurs, to generate the connection information using a restoration algorithm, to store the connection information in the associated switch state tables, and to refresh the switch state table with refreshed connection information by continuing to generate the connection information using the restoration algorithm before the failure in the optical network is detected. The plurality of optical switches also operable to automatically perform optical switching using the connection information stored in the at least one switch table.

The present invention provides a profusion of technical advantages that include the capability to quickly and efficiently restore an optical network after a failure or fault that minimizes the amount of dropped telecommunications traffic due to the failure. This results in greater overall network reliability, increased network carrier revenues due to reduced outages, and increased optical network user satisfaction.

Another technical advantage includes the capability to automatically and quickly configure the OCCSs of the optical network based on one or more switch state tables that have been previously stored in or are locally accessible to each such OCCS. This automatic response provides efficient recovery from the failure.

Yet another technical advantage of the present invention includes the capability to refresh the various switch state tables that are locally accessible by the various OCCSs by continuing to run simulations, either at a central database or through off-line DRA simulations and on-line DRA simulations, such as those described in U.S. patent application Ser. No. 09/148,943, filed Sep. 8, 1998, and now U.S. Pat. No. 6,404,733, and entitled *Method of Exercising A Distributed Restoration Process in an Operational Telecommunications Network*, which is hereby incorporated by reference for all purposes. This results in more accurate switch state tables.

The present invention provides the significant technical advantage that includes the capability to take into account the "new" optical network configuration after a failure has occurred, or when any network reconfiguration or provisioning occurs. Thus, subsequent switch state tables will take into account this configuration when calculated and refreshed in the future. This results in a more optimal restoration with less unrestored traffic.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
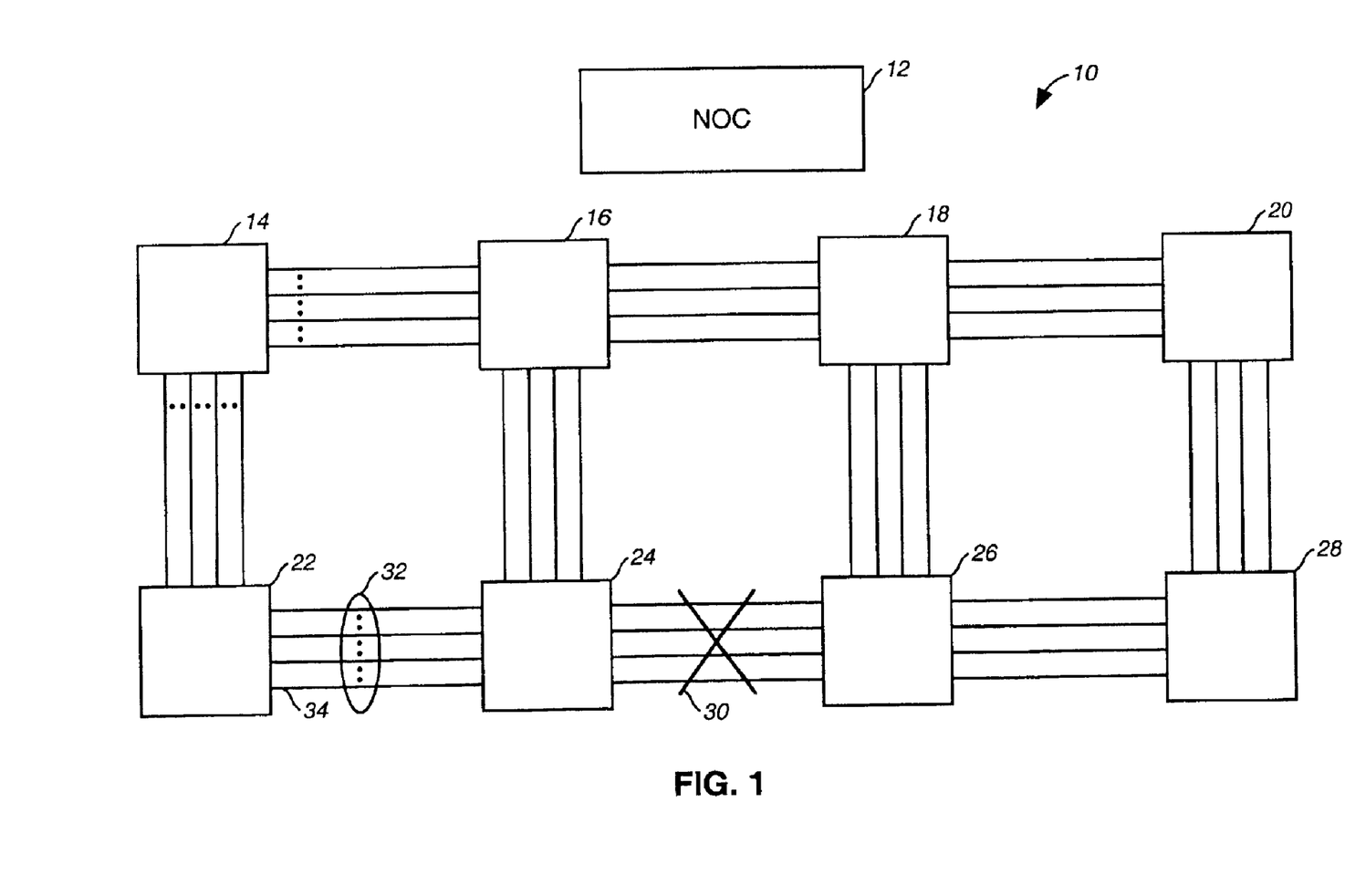
FIG. 1 is a block diagram that illustrates an optical network that includes a plurality of Optical Cross Connect Switches ("OCCSs") or nodes coupled in a mesh topology through various fiber optic links, and a Network Operations Center ("NOC") in communication with the plurality of OCCSs.

FIG. 1 is a block diagram that illustrates an optical network 10 that includes a plurality of Optical Cross Connect Switches ("OCCSs") or nodes coupled in a mesh configuration through various fiber optic links, and a Network Operations Center ("NOC") 12 in communication with the plurality of OCCSs or nodes of the optical network 10. The optical network 10 is provided in a mesh configuration (but could be provided in other network topologies) that includes an OCCS 14, an OCCS 16, an OCCS 18, an OCCS 20, an OCCS 22, an OCCS 24, an OCCS 26 and an OCCS 28. The NOC 12 may provide any of a variety of functions, such as, for example, network management control and, although not expressly illustrated in FIG. 1, the NOC 12 will preferably be in communication with each of the various OCCSs 14–28 to exchange various information, such as status and provisioning information. The OCCSs 14–28 may also be referred to as digital cross connect switches, and, each will generally include a switch fabric or matrix that is coupled to various ingress and egress ports, which are coupled to fiber optic links, such as a fiber optic link 34 between the OCCS 22 and the OCCS 24. In the event of a failure in the optical network 10, the OCCSs 14–28 will each be controlled or configured, in a preferred embodiment, through a switch state table that is associated with each of the OCCSs 14–28.

The plurality of OCCSs 14–28 may, in one embodiment, communicate signaling or status information with each other through the exchange of messages through one or more dedicated or designated communications channels, such as through a wide area signaling network that couples the various OCCSs of the optical network 10. This allows for failure or fault information to be communicated from one node or OCCS to another node in a sender and receiver relationship or peer-to-peer relationship. For example, known Distributed Restoration Algorithms ("DRAs") may use such sender and receiver information from one node or OCCS to another node to determine the location of a failure. In one embodiment, the OCCS 26 may broadcast or send out a failure message when the optical links with OCCS 24 are lost. This failure message may then be broadcast to one or more of the various OCCSs of the optical network 10. In other embodiments, the NOC 12 is in communication with each of the OCCSs 14–28 and uses this communication to determine where a failure has occurred.

Some of the OCCSs of the optical network 10 will be positioned as edge or boundary switches that interface with another telecommunications network or link that transmits telecommunications signals in the electrical domain. These OCCSs may be the ingress and egress points on the optical network 10 where telecommunications signals are communicated through the optical network 10. If a failure occurs, at an optical link that is coupled to an egress port of such an edge or boundary switch, sometimes the telecommunications traffic provided at a corresponding ingress port of the same edge switch may be switched to another OCCS of the optical network 10 either by such an edge switch or through other means or equipment. For example, such edge, boundary or periphery OCCSs may include the capability to provide electrical domain switching of ingress telecommunications traffic that is in the electrical domain so that this ingress telecommunications traffic can be received at an ingress port at another OCCS of the optical network 10.

The mesh topology of the optical network 10 allows for telecommunications traffic to be rerouted or reprovisioned when a network fault or failure occurs. For example, if a failure 30 occurs in the fiber optic links or spans between the OCCS 24 and the OCCS 26, the telecommunications traffic carried over those optical links may be rerouted around the failure 30. The present invention may utilize any of a number of known and/or available restoration algorithms or simulations for calculating or determining connection information, in the form of refreshed switch state tables associated with each OCCSs, that defines optical link connections of the OCCSs 14–28 of the optical network 10. In general, such restoration techniques may be divided into on-line techniques and off-line techniques. An example of an on-line technique is a DRA in which all of the plurality of nodes or OCCSs 14–28 may communicate with each other through available links, such as spare links, or through an external network such as a wide area network not shown in FIG. 1. The capability for each of the nodes or OCCSs of the optical network 10 to communicate status messages to one another allows for such message communications to take place while the optical network 10 is in operation.

An example of an off-line restoration algorithm or simulation is one in which a mathematical model or representation, such as through a database model, of the configuration and topology of the optical network 10 is used to simulate one or more network failures and to calculate an efficient solution, by calculating connection information, for each such failure condition. This may occur off-line, such as at the NOC 12 or through the use of an off-line DRA. These off-line simulations will be used, in the present invention, to define switch state tables or state tables for each OCCS that will define a correlation between each such network failure condition and a corresponding OCCS switch configuration or connections. This is illustrated below in connection with FIG. 3 In this manner, once a failure condition is identified, each of the OCCSs 14–28 can automatically make the connections defined in their associated switch state table for the particular failure. In a preferred embodiment, these switch state tables will be loaded in local memory or at a locally accessible storage such that each of the OCCSs 14–28 can automatically act on such switch state tables. The quick action and efficiency of such a system allows for minimal loss of optical telecommunications traffic. The present invention allows these switch state tables to be automatically updated so that any changes in the optical network 10 that may have occurred (such as provisioning or reconfiguration events) will be considered in the simulations to ensure a more optimal solution when calculating the switch state tables.

The NOC 12 will generally be located at a central location where the status of the optical network 10 can be monitored, the maintenance of the optical network 10 can be coordinated, and the loading and usage of the optical network 10 can be accumulated. The NOC 12 will, preferably, provide, maintain, and administer various services of the optical network 10. Such applications may reside completely or partially in the NOC 12 or will be distributed to the various nodes and OCCS controllers (may be stored directly at the OCCS controller for faster restoration time) of the optical network 10. In one embodiment of the present invention, the NOC 12 includes a computer model or database of the optical network 10 that includes the topology and provisions of the various equipment, such as the OCCSs 14–28, so that restoration simulations and studies can be executed off-line to calculate the various switch state tables of the present invention. The NOC 12 may also be used in determining the location of a failure, and in determining the current state or configuration of the network so that the most accurate model of the network will be used in the restoration simulations and calculations.

In operation, connection information is generated and stored in a state table that is associated, or stored locally, at each of the OCCSs 14–28 (may be stored directly at the OCCS controller for faster restoration time). In one embodiment, this connection information is generated from restoration algorithms or simulations done off-line at the NOC 12, and, in another embodiment, the connection information that is stored in each of the switch state tables of the OCCSs 14–28 are generated on-line using DRA simulations that are executed while the optical network 10 is in operation. The status of the optical network 10, in one embodiment, is continuously monitored, such as by the NOC 12 or by using DRA techniques, to determine whether a failure in the optical network 10 has occurred.

The various switch state tables of the OCCSs 14–28 may be refreshed by continuing to generate and store connection information in the plurality of switch state tables. This may be done periodically, or performed each time the topology of the optical network 10 changes. For example, the NOC 12 may receive a signal from one of the OCCSs that a connection has changed or that a fiber optic link has been added. In such a case, the NOC 12 will indicate that the topology of the optical network 10 has changed and this may result in the refreshing of the switch state tables by generating and storing connection information for the plurality of switch state tables.

Once a failure is detected in the optical network 10, optical switching is automatically performed in the OCCSs 14–28 based on the associated fault corresponding to the optimum switch state table, which in a preferred embodiment, are stored in local memory in each of the OCCSs 14–28. The detection of a failure in the optical network 10 may be achieved using any known or available method. For example, DRA messaging, such as flooding, may be used to determine where a failure is located. In other embodiments, the NOC 12 will receive a signal from a node or OCCS that indicates a failure in the optical network 10.

Once the switch state tables are used to automatically perform any needed switching to restore the effected telecommunications traffic, assessment may be performed to determine whether any of the telecommunications traffic in the optical network 10 is still not restored. In one embodiment of the present invention, either on-line or off-line restoration simulations and studies are run to generate refreshed switch state tables that reflect the current topology or state of connections of the optical network 10 after the restoration due to the automatic optical switching.

If not all of the telecommunications traffic was restored by the automatic optical switching, additional distributed restoration techniques may be used to restore any remaining traffic. In one embodiment, the edge or periphery OCCSs are used to perform distributed restoration in the electrical domain such that the effected telecommunication traffic may be routed to another OCCS of the optical network 10 to restore the lost or dropped telecommunications traffic.

Figure 2:
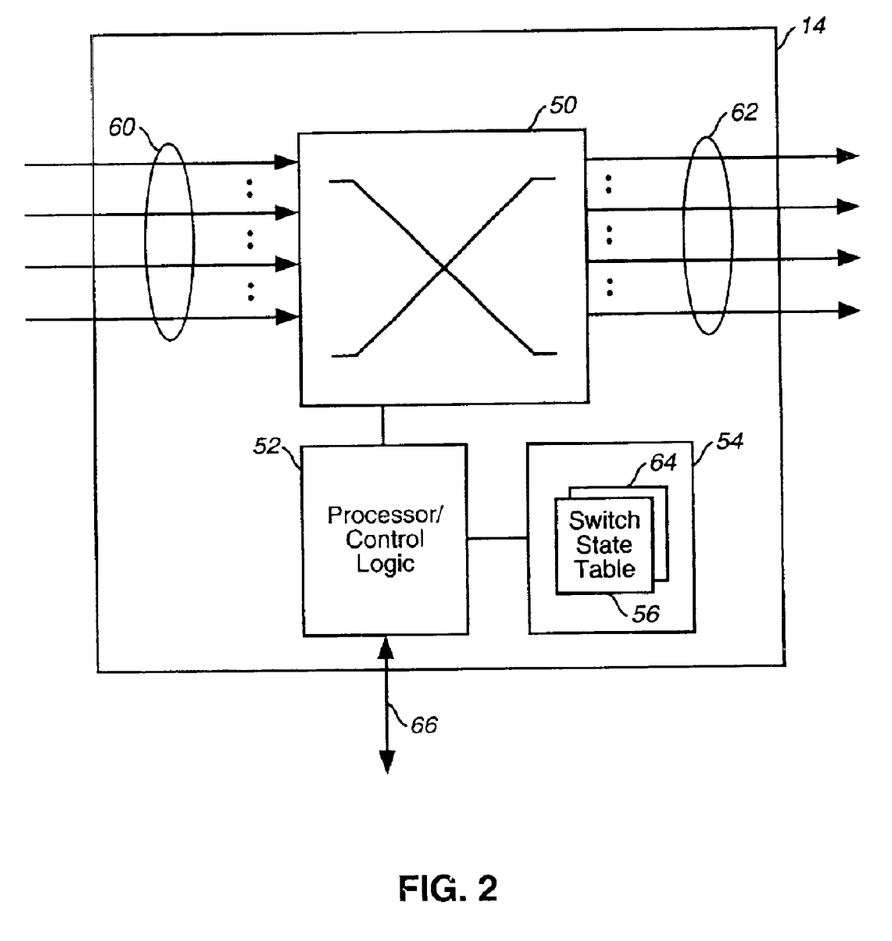
FIG. 2 is a block diagram that illustrates an OCCS of the optical network that may be used in an embodiment of the present invention.

FIG. 2 is a block diagram that illustrates the OCCS 14 of the optical network 10 that may be used in an embodiment of the present invention. The OCCS 14 includes a switch fabric or matrix 50 that is operable to receive one or more optical telecommunication signals through a plurality of optical links 60 at various ingress ports of the switch matrix 50. The switch matrix 50 also includes a plurality of egress ports that each may couple to one of the plurality of optical links 62.

The switch matrix 50 is controlled by a processor/control logic 52, which uses the contents of the switch state table 56 that is shown in a local memory 54. In another embodiment, the switch state table 56 is provided outside of the OCCS 14 but is locally accessible by the processor/control logic 52.

Because multiple switch state tables may be associated with the OCCS 14, a second switch state table 64 is shown also stored at the local memory 54. The OCCS 14 may also receive signaling information, such as signaling information or messages to indicate that a failure has occurred, along with the specific information of the particular failure, through control information which is shown being provided through a link 66. Of course, the OCCS 14 of the present invention may receive such signal or optical network failure information from any available communications link, including spare or additional links that are provided through the switch fabric 50.

In operation, the OCCS 14 receives the switch state table connections 56, and possibly updates or refreshed switch state tables, so that when the OCCS 14 receives an indication that a failure has occurred and information as to the location of that failure, the OCCS 14 may automatically use the switch state table 56 to reconfigure or reconnect the various ingress ports to the various egress ports of the switch fabric 50 as indicated in the switch state table 56.

Figure 3:
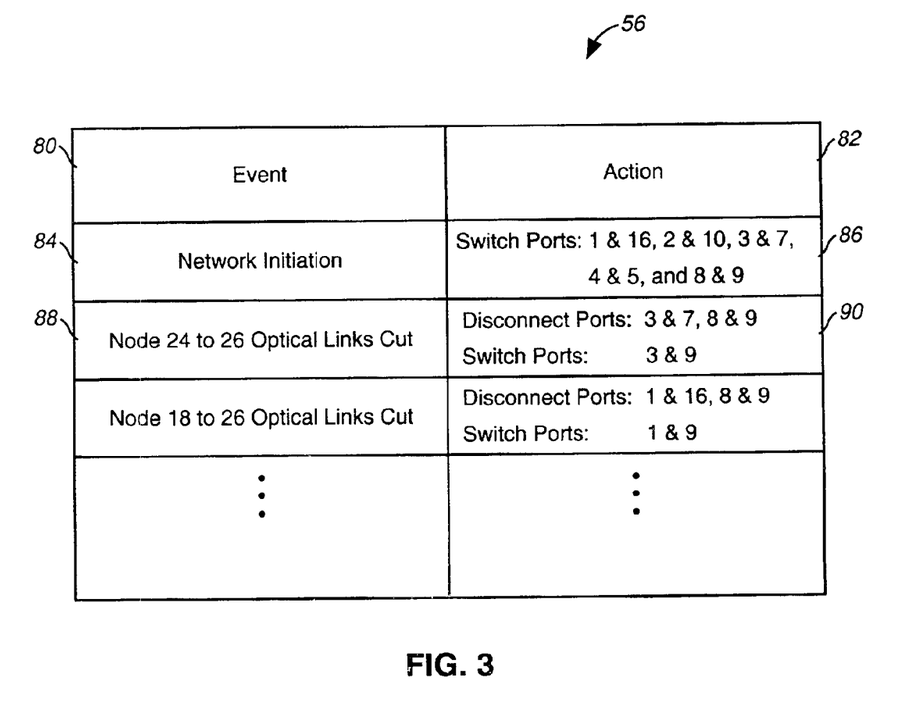
FIG. 3 is a block diagram that illustrates an example of an embodiment of a switch state table that may be refreshed in accordance with an aspect of the present invention.

FIG. 3 is a block diagram 80 that illustrates an example of an embodiment of the switch state table 56, which was just discussed above in connection with FIG. 2, and that may be refreshed in accordance with an aspect of the present invention. The switch state table 56 includes an event column 80 and a corresponding action column 82. It should be noted that the switch state table 56, as illustrated, is only an example of one embodiment of a switch state table that may be utilized by the present invention.

The event column 80 includes or defines various network events, such as failure conditions, and the action column 82 includes a corresponding action that an OCCS, such as the OCCS 14, should take as a result of the event. For example, block 84 may be referred to as the network initiation or boot-up network condition that corresponds or correlates to the configuration information of the various ingress and egress ports of the OCCS 14 as provided by block 86. This indicates, for example, that ports 1 and 16 should be connected, similar to ports 2 and 10, ports 3 and 7, ports 4 and 5, and ports 8 and 9.

A block 88 is shown in FIG. 3 under the event column 80 in which two nodes of the optical network 10 are indicated to have been cut or severed. For example, and referring to FIG. 1, the optical links between the OCCS 24 and the OCCS 26 have been cut as indicated by the failure 30. In response, the OCCS 14 of the optical network 10 may automatically, according to an aspect of the present invention, reconfigure its ingress and egress ports according to a corresponding action block 90. Block 90 indicates that ports 3 and 7 should be disconnected, along with ports 8 and 9, while ports 3 and 9 should be connected or placed in communication with one another. It should be understood, that the actions shown are merely illustrative and should not be interpreted to limit the present invention. Because the contents of the switch state table 56 are stored locally or are locally accessible by the OCCS 14, the restoration activities dictated by the block 90 will be quickly and efficiently carried out.

Figure 4:
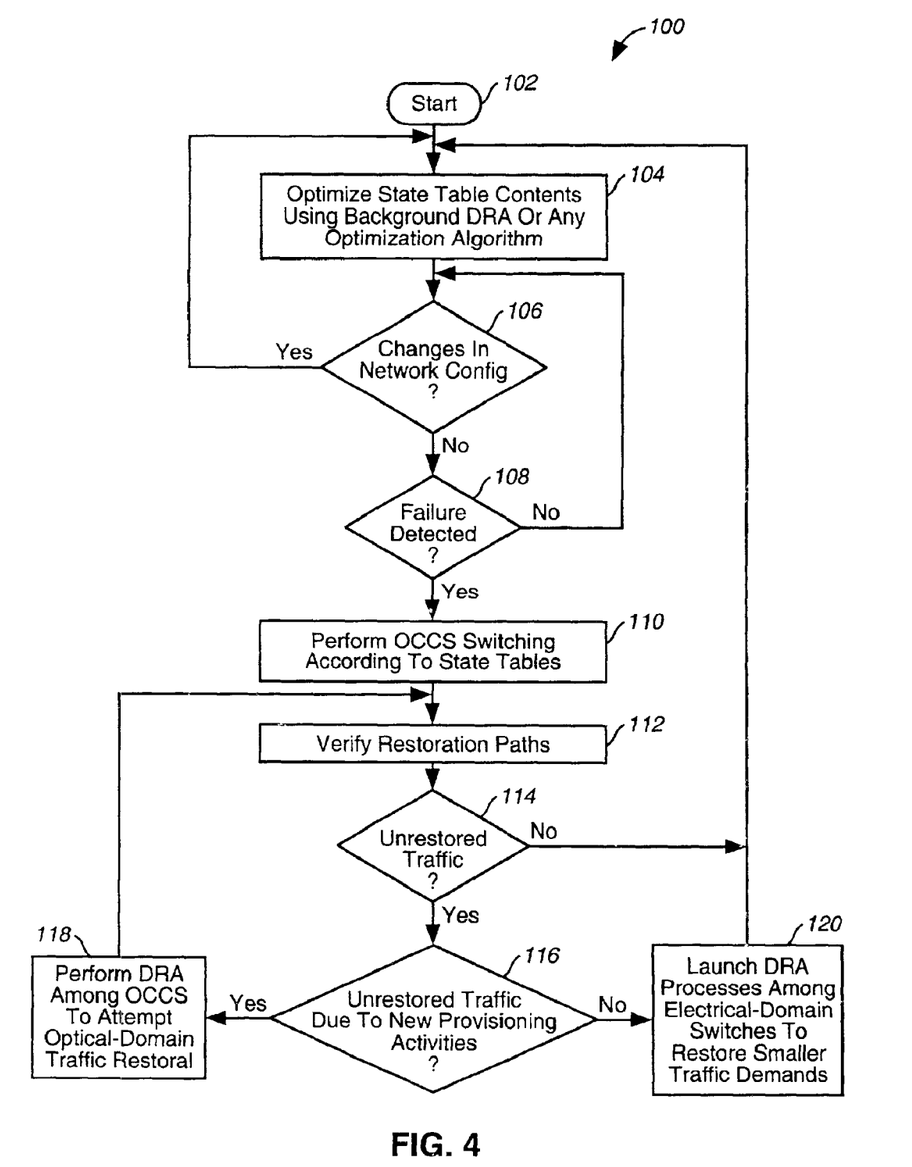
FIG. 4 is a flowchart that illustrates a method for recovering from a failure in an optical network using refreshed switch state tables according to an embodiment of the present invention.
Figure 5:
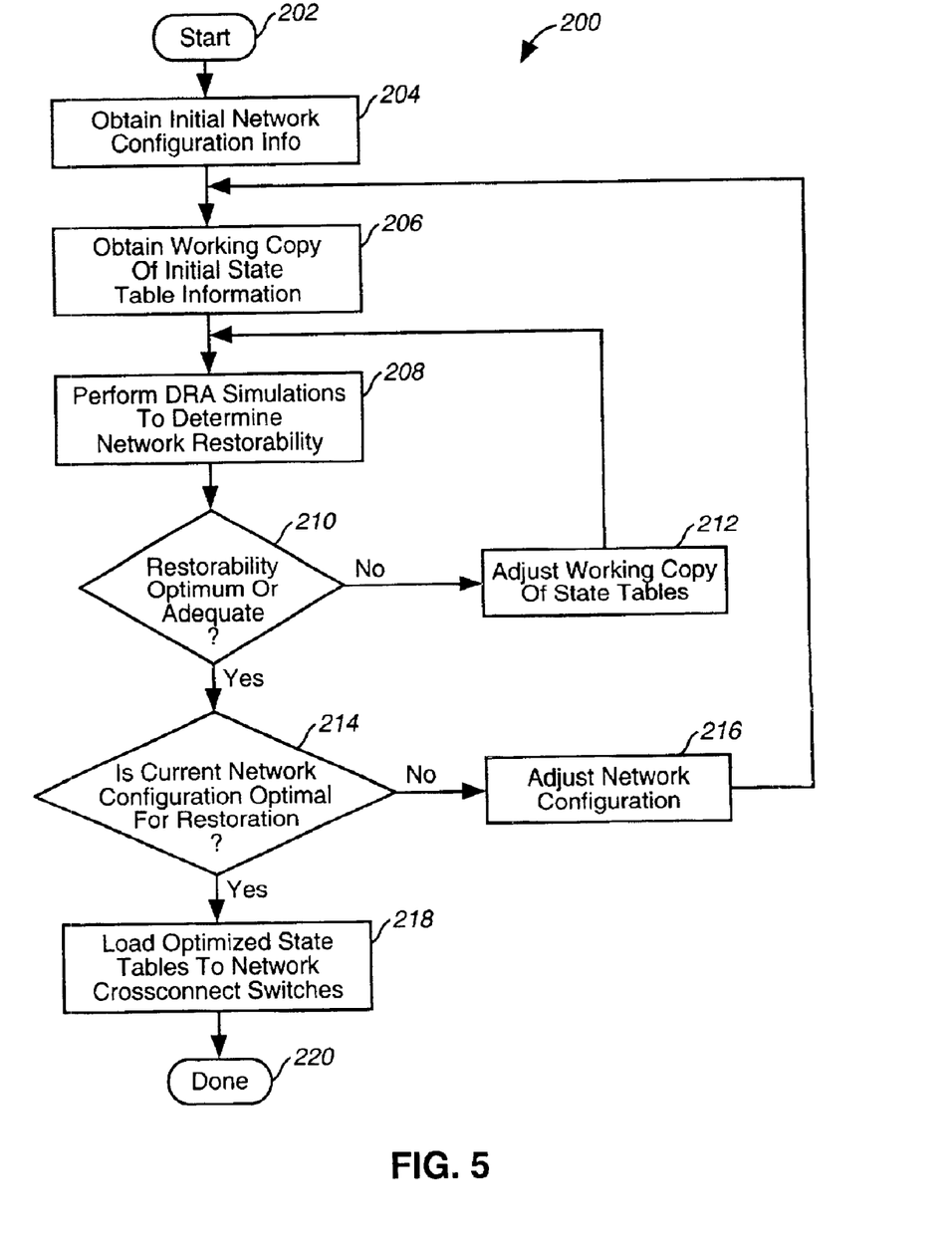
FIG. 5 is a flowchart that illustrates a method for generating connection information that corresponds to various failure conditions of an optical network and storing such connection information in various switch state tables that are associated with various OCCSs of an optical network according to one embodiment of the present invention.

FIG. 4 is a flowchart that illustrates a method 100 for recovering from a failure in an optical network, such as the optical network 10, using refreshed switch state tables according to an embodiment of the present invention. The method 100 begins at start block 102 and proceeds to block 104. At block 104, the various switch state tables of an optical network are generated and stored for various failure conditions in the optical network. This may be achieved using any known or available restoration algorithm or simulation. For example, U.S. Pat. No. 6,111,672, which is entitled Method, Apparatus, And Computer Program Product For Optical Network Restoration, names Davis et al. as inventors and which is incorporated herein by reference for all purposes, provides examples of network restoration techniques. As discussed above, this may include both on-line and off-line restoration techniques and may include either centralized and/or distributed restoration algorithms and techniques. These calculations may be referred to as simulations that are used to simulate various failure conditions on the network so that desired connection information may be determined and stored in the various switch state tables of the optical network. FIG. 5, which is discussed more fully below, provides an example of a method for generating such connection information for various optical network failure conditions.

The method 100 proceeds next to decision block 106. At decision block 106 it is determined whether changes in the optical network, such as topology or configuration changes, are present. If so, the method 100 proceeds back to block 104 where the various switch state tables of the optical network may be recalculated or refreshed. If the topology or configuration of the optical network has not changed, the decision block 106 proceeds next to decision block 108. Decision block 108 may be described as monitoring the status of the optical network to determine if a failure has occurred in the optical network. If no failure has occurred, the method 100 proceeds back to the decision block 106 where the network is once again monitored to determine if any changes in the network topology or configuration has occurred. If so, the decision block 106 proceeds as described above.

When the method 100 proceeds back to the decision block 106 and it is determined that changes have occurred either in the topology or configuration of the optical network, the switch state tables are recalculated, or may be referred to as being refreshed, such that the connection information of these plurality of switch state tables is generated and stored. Otherwise, decision block 108 continues to monitor the network until a failure is detected. At such time, the method 100 proceeds from the decision block 108 to a block 110.

At block 110, the various OCCSs automatically perform whatever switching is defined by the switch state table that is associated with that particular OCCS. As a result, and assuming that the prior calculations were performed correctly and that the network topology or configuration information used in such prior calculations was correct, the telecommunications traffic that was affected by the failure should be restored. Proceeding next to a block 112, the restoration of the various optical lengths or paths of the optical network are verified.

Proceeding next to decision block 114, if no unrestored traffic exists, the method 100 proceeds back to the block 104, where the current state of the optical network is considered in the restoration algorithms that are then used to calculate and further refresh or update the switch state tables if needed. Otherwise, the decision block 114 proceeds to decision block 116.

At decision block 116, it is determined whether the unrestored traffic is due to the switching or reconfiguration activities just performed to attempt to restore the network traffic due to the failure. If the unrestored telecommunications traffic was due to or caused by the activities just completed, the method 100 proceeds to block 118 where an algorithm, such as a distributed restoration algorithm or a centralized restoration algorithm, is performed among the OCCSs of the optical network in the optical-domain to restore any unrestored telecommunications traffic. The method 100 then proceeds from block 118 to block 112 to verify whether any unrestored traffic still remains.

Referring back to decision block 116, if the unrestored telecommunications traffic was not due to the reconfiguration activities initiated in response to the failure, the method 100 proceeds to block 120. At block 120, the edge or periphery OCCSs may perform or launch a distributed restoration algorithm or simulation of the telecommunications traffic in the electrical domain to restore any unrestored telecommunications traffic, which typically will be smaller telecommunications traffic at the edge of the network. The method 100 then proceeds from the block 120 to block 104.

As is illustrated, the method 100 of the present invention provides a fast and accurate restoration mechanism such that a network failure results in minimal telecommunications traffic disruptions and when any unrestored telecommunications traffic remains, it can be quickly and conveniently restored.

FIG. 5 is a flowchart that illustrates a method 200 for generating connection information that corresponds to various failure conditions of an optical network and storing such connection information in various switch state tables that are associated with various OCCSs of an optical network according to one embodiment of the present invention. The method 200 begins at start block 202 and proceeds to block 204 where initial network configuration or topology information is obtained. In one embodiment, the network is already aware of its current topology and this information is easily available, such as through a NOC. In other embodiments, self-discovery techniques (such as RSVP-TE in IP packets or PNNI in ATM cells) may be used to learn the current or initial network configuration or topology of an optical network.

The method 200 proceeds next to block 206 where a working copy of the initial network configuration information is obtained. This will generally include a copy of the initial state tables of the various OCCSs of an optical network. This also may be referred to as an off-line copy of such connection information. The method 200 proceeds next to block 208 where a DRA simulation may be performed to determine the restorability of the optical network. For example, the DRA simulations described in U.S. patent application Ser. No. 09/148,943, filed Sep. 8, 1998, and now U.S. Pat. No. 6,404,733, and entitled *Method of Exercising A Distributed Restoration Process And An Operational Telecommunications Network*. In a preferred embodiment, this simulation is performed while the optical network is live or on-line. It should be noted that no restoration actions have to be taken at this time. In this manner, more accurate results may be obtained as to the restorability of the optical network based on the simulations or restoration calculations that are used to generate connection information for the various state tables that are associated with the various OCCSs of the applicable network. If the DRA simulation results in large amounts of unrestored telecommunications traffic, the results will not generally be considered restorable and another solution to the simulation would be obtained.

The method 200 proceeds next to decision block 210 where it is determined whether the restorability determined in the block 208 is optimal or adequate. If it is not adequate, the method 200 proceeds to block 212 where the state tables are adjusted and the simulation performed in block 208, as described above, is performed again. In one embodiment of the method 200, the adjustment of working copy tables is minimized as it may affect/drop live traffic. This may be achieved by adjusting the state tables during "off peak" times and performing the actions of blocks 208, 210 and 212 without adjusting the state tables. When "optimum" or acceptable results are obtained, the working copy of the state tables may be adjusted. Otherwise, decision block 210 proceeds to decision block 214. In this manner, the present invention provides the significant advantage of further ensuring that when a failure occurs, the restoration response will be one that is optimal or adequate.

At decision block 214, the determination is made whether the current network configuration is optimal for restoration. If it is not, the method 200 proceeds to decision block 216 where the current network configuration is changed so that an optimal network restoration plan may be achieved through the generation of connection information that will be stored in various switch state tables associated with the various OCCSs of the optical network. Otherwise, the method 200 proceeds to block 218 where the optimized state tables are stored at the various OCCSs of the optical network, or in an alternative embodiment, they are stored where they may be easily accessed by their respective OCCSs of the optical network, so that the OCCSs may be automatically switched according to the contents of the associated switch state tables. The method proceeds next to block 220 where the method 200 ends.

Thus, it is apparent that there has been provided, in accordance with the present invention, a method and optical network that provides for optical network restoration using refreshed switch state tables that satisfy one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components of the present invention may be combined or integrated in another system or certain features may not be implemented. Also, the components, techniques, systems, sub-systems, layers, and methods described and illustrated in the preferred embodiment as discrete or separate may be combined or integrated with other components, systems, modules, techniques, or methods without departing from the scope of the present invention. The present invention may be implemented to function using virtually any available network topology, such as a mesh network or a network that employs ring networks. Other examples of changes, substitutions, and alterations are readily ascertainable by one skilled in the art and could be made without departing from the spirit and scope of the present invention.

What is claimed is:

1. A method for recovering from a failure in an optical network using switch state tables, the optical network including a plurality of optical links coupled through a plurality of optical switches for exchanging telecommunications traffic, the method comprising:

generating and storing connection information in a plurality of switch state tables that are associated with the plurality of optical switches of the optical network, wherein the connection information defines optical link connections to be made through the plurality of optical switches in the event of the failure in the optical network;

monitoring the status of the optical network to determine when the failure in the optical network occurs;

refreshing the plurality of switch state tables by continuing to generate and store connection information in the plurality of switch state tables that are associated with the plurality of optical switches of the optical network until the failure in the optical network occurs;

automatically performing optical switching in the plurality of optical switches based on the determination of the failure in the optical network and based on the connection information in the plurality of switch state tables that are associated with the plurality of optical switches and that define optical link connections to be made through the plurality of optical switches in the event of the failure; and determining whether any of the telecommunications traffic in the plurality of optical links of the optical network was not restored due to the automatically performing optical switching.

2. The method of claim 1, further comprising:

performing a restoration of the optical network to restore at least some of the telecommunications traffic if the telecommunications traffic was not restored due to the automatically performing optical switching.

3. The method of claim 2, further comprising:

performing distributed restoration of electrical domain switches of the optical network to restore at least some of the telecommunications traffic if the telecommunications traffic was not restored due to reasons other than the automatically performing optical switching.

4. The method of claim 3, wherein performing distributed restoration of electrical domain switches includes electrical domain switches located at periphery connections of the optical network where the optical network interfaces with another network.

5. The method of claim 1, wherein refreshing the plurality of switch state tables by continuing to generate and store connection information includes obtaining topology information of the optical network.

6. The method of claim 5, wherein refreshing the plurality of switch state tables occurs only if the topology of the optical network changes since a last time connection information was generated and stored in the switch state tables.

7. The method of claim 1, wherein the generated and stored connection information is provided in one or more of the plurality of switch state tables for each of the plurality of optical switches of the optical network, wherein the connection information includes at least event information and corresponding action information for each of the plurality of optical switches such that each such optical switch can take an action in response to an event.

8. The method of claim 7, wherein the connection information associated with each of the plurality of optical switches of the optical network is stored in one or more of the plurality of switch state tables that are located at the associated optical switch.

9. The method of claim 1, wherein generating and storing connection information includes obtaining topology information of the optical network using a distributed restoration algorithm.

10. The method of claim 1, wherein generating and storing connection information includes obtaining topology information of the optical network from a database of a network operations center.

11. The method of claim 1, wherein refreshing the plurality of switch state tables by continuing to generate and store connection information includes obtaining updated topology information of the optical network using a distributed restoration algorithm.

12. The method of claim 1, wherein refreshing the plurality of switch state tables by continuing to generate and store connection information includes obtaining updated topology information of the optical network from a database of a network operations center.

13. The method of claim 1, wherein refreshing the plurality of switch state tables is repeated after automatically performing optical switching in the plurality of optical switches based on the determination of the failure.

14. In an optical network, a method for recovering from a failure in a portion of the optical network, the method comprising:
providing, for at least one optical switch in the optical network, an associated switch state table that contains connection information used to determine connections to be made through the at least one optical switch when a failure is detected in the optical network;
prior to the failure, automatically determining a plan of action for how to perform optical switching in the optical network to recover from the failure;
updating the switch state table associated with the at least one optical switch based on the plan of action;
upon detection of the failure, establishing connections in the optical switch according to the contents of the switch state table; and
applying a restoration algorithm to re-establish connection in the optical switch when the establishing connections in the optical switch according to the contents of the switch state table results in inadequate recovery to the failure.

15. The method of claim 14, further comprising:
after the failure, repeating the automatic determination of a plan of action.

16. The method of claim 14, wherein the determining the plan of action includes retrieving the current switch state table contents associated with the at least one optical switch.

17. The method of claim 14, wherein the determining the plan of action includes simulating the failure in a computer model of the optical network.

18. The method of claim 14, wherein the determining the plan of action includes simulating the failure by issuing at least one artificial failure indication in the optical network.

19. The method of claim 14, wherein automatically determining a plan of action includes using a second restoration algorithm to find alternate paths by which to recover from the failure.

20. The method of claim 14, wherein the restoration algorithm includes a distributed restoration algorithm or a centralized restoration algorithm.

21. The method of claim 20, wherein the restoration algorithm is a distributed restoration process performed within electrical-domain equipment that is coupled to the optical network.

22. The method of claim 14, further comprising:
determining completeness of recovery achieved in the optical network after making connections in the optical switch in response to the failure; and
performing a real-time analysis to find alternate paths that may be used to effect further recovery in the optical network when the completeness of recovery is inadequate.

23. The method of claim 14, further comprising:
determining a completeness of recovery achieved after the making connections in the optical switch in response to the failure;
determining whether incomplete recovery is caused by changes in the configuration of the optical network occurring since the plan of action was previously determined; and
performing a real-time analysis to find and activate alternate paths that may be used to effect further recovery in the optical network when incomplete recovery is caused by the changes in configuration.

24. An optical network operable to provide network restoration from a failure in the optical network, the optical network comprising:
a plurality of optical switches that are each associated with at least one switch state table for storing connection information, wherein the connection information defines optical link connections to be made through the plurality of optical switches in the event of failure in the optical network;
a plurality of optical links each operable to connect between at least two of the plurality of optical switches of the optical network; and
a network restoration system operable to detect when the failure occurs, to generate the connection information using a first restoration algorithm, to store the connection information in the at least one switch state table, the network restoration system operable to refresh the at least one switch state table with refreshed connection information by continuing to generate the connection information using the restoration algorithm before the failure in the optical network is detected, and to re-generate the connection information using a second restoration algorithm performed in the optical-domain when the optical network does not fully recover from the failure in the optical network,
wherein the plurality of optical switches are operable to automatically perform optical switching using the connection information stored in the associated at least one switch table in the event of the failure of the optical network.

25. The optical network of claim 24, further comprising:
a network operations center that includes the network restoration system as an off-line network restoration system that is operable to determine various failure simulations.

26. The optical network of claim 24, wherein the network restoration system is distributed among the plurality of optical switches and uses a distributed restoration algorithm to provide on-line network restoration failure simulations.

27. A method for generating and storing connection information in a plurality of switch state tables for use with associated optical switches of an optical network, the connection information used when automatically switching the optical switches in the event of a failure in the optical network, the method comprising:
obtaining current configuration information of the optical network;
performing distributed restoration simulations using the current configuration information to calculate connection information for the plurality of switch state tables for various failures of the optical network;
determining if the restoration simulation is adequate;
performing the distributed restoration simulations again if the restoration simulation was not adequate;
determining if the current configuration of the optical network is adequate;
adjusting the current configuration of the optical network if the current configuration of the optical network was not adequate by performing the distributed restoration simulations again; and
storing the calculated configuration information in the plurality of switch state tables.

* * * * *